United States Patent [19]

Williams

[11] 4,299,021

[45] Nov. 10, 1981

[54] AXIAL IMPACT TOOL

[76] Inventor: Luther M. Williams, 145 Whitehall Apts., 3218 Hikes La., Louisville, Ky. 40220

[21] Appl. No.: 95,345

[22] Filed: Nov. 19, 1979

[51] Int. Cl.[3] ......................... B23P 11/00; B25C 1/02

[52] U.S. Cl. .................................. 29/432; 81/177 A; 227/147; 227/113; 227/156; 411/439; 411/441; 411/458

[58] Field of Search ............ 81/177 A; 227/113, 147, 227/156; 29/432; 411/439, 441, 457, 458, 459, 460, 461, 471

[56] References Cited

U.S. PATENT DOCUMENTS

| | | | |
|---|---|---|---|
| 9,112 | 7/1852 | Carpenter | 227/147 |
| 327,537 | 10/1885 | Dodsworth | 227/147 |
| 746,549 | 12/1903 | Modlin et al. | 227/147 |
| 1,500,253 | 7/1924 | Miller | 227/147 |
| 1,575,582 | 3/1926 | Joy | 227/156 X |
| 1,604,675 | 10/1926 | Bernard | 227/147 |
| 2,330,575 | 9/1943 | Grauding | 227/147 |
| 2,520,652 | 8/1950 | Pfauser et al. | 81/177 A |
| 2,587,944 | 3/1952 | Williams | 227/147 X |
| 2,624,879 | 1/1953 | Baird | 227/147 |
| 2,632,890 | 3/1953 | Tietig | 227/113 X |
| 2,666,201 | 1/1954 | VanOrden | 227/147 |
| 3,036,482 | 5/1962 | Kenworthy et al. | 227/147 |
| 3,491,933 | 1/1970 | Thurner et al. | 227/147 |
| 4,054,237 | 10/1977 | Rivtveld | 227/147 |

FOREIGN PATENT DOCUMENTS

| | | | |
|---|---|---|---|
| 683045 | 6/1930 | France | 227/156 |

OTHER PUBLICATIONS

Chilton's Hardware Age June, 1980 p. 105.
Richards' Tool Mfg. Co. Mailout Literature.

*Primary Examiner*—Paul A. Bell
*Attorney, Agent, or Firm*—Wm. R. Price

[57] ABSTRACT

The invention relates to an axial impact tool for driving nails or staples into normally inaccessible places. The tool consists of a guide tube and impact rod slidable inside of said guide tube and containing a heavy handle extending outside of one end of said tube and a magnetic fitting which fits onto the guide rod for grasping and driving a ferromagnetic fastening means such as a nail or staple into position. Additionally, the invention contemplates the use of spacer elements which fit between the guide rod and the handle so as to prevent the guide rod from making a full stroke leaving a portion of the nail or staple exposed. This is for purposes such as hanging pictures, or for temporarily placing a board or panel into position so that it can be easily removed later. Additionally, the invention contemplates the use of an impact rod made up of two or more integral parts and a guide tube made up of two or more integral parts for purposes of portability and for purposes of lengthening or shortening by addition or removal of an integral part, depending upon the requirements for accessibility to a particular position. Additionally, a penlight is contemplated for use with the tool and which is mountable upon the guide tube.

3 Claims, 16 Drawing Figures

2
3
32
9
4

9
4
11
12
10

2
3
4
5
9
6
7
10

12
11
13
14
28

14
13
13

27

26
29
13
27

AXIAL IMPACT TOOL

FIELD OF THE INVENTION

This invention relates to hand tools and specifically to axial impact tools for driving nails and staples or other fastening devices into a substrate. More specifically, this invention relates to an axial impact tool for driving a nail or staple into a relatively inaccessible place or for driving such device from a somewhat remote location.

DESCRIPTION OF THE PRIOR ART

Many devices have been proposed in the past for axial impact driving instruments. Note for example, the patent to Kenworthy, U.S. Pat. No. 3,036,482, which provided a tool of the general type of this invention. Kenworthy's device, however, was primarily related to a device with detachable heads, which could be used for various purposes. Additionally, Kenworthy provided a device with a detent means for holding the fastening member, such as a nail or staple, in position while the tool was in use in driving it into the desired location.

In an earlier patent Baird proposed a nail driving mechanism in U.S. Pat. No. 2,624,879, which utilized a magnetized ram for driving the nail into position. The difficulty with Baird's device, however, was the fact that the entire rod was magnetized and therefore it was necessary to use a non-magnetic guide tube such as brass or the like which, of course, is quite expensive. Grauding proposed a tool back in 1943, in U.S. Pat. No. 2,330,575, having multiple fittings for various types and sizes of fastening means. Modlin and Buhl back in 1903 proposed a staple driver in U.S. Pat. No. 746,549 adapted primarily for use in driving fencing staples. This device contained a slot for reception and holding of the staple into position to drive it over the fencing wire onto the post. Due to the fact that the staple was driven over the wire, Modlin and Buhl did not provide a method of driving the staple completely into the desired substrate. The patent to Miller, U.S. Pat. No. 1,500,253, provided for a rivet holding and setting tool having a particular slot into which the head of the rivet was inserted prior to being driven into position. Other patents are those of Carpenter, U.S. Pat. No. 9,112, in 1852; 327,537 to Dodsworth in 1885; and Thurner, 3,491,933. It is quite clear that many axial impact devices have been proposed in the past, however, essentially all of these devices while suitable for one use have had some objectionable feature when applied to another use. Thus, for example, although magnetized impact rods have been proposed in the past, the proposals have utilized rods which are magnetized along their entire length, thus requiring a non-magnetic guide tube of expensive materials such as brass or the like. Additionally, insofar as applicant is aware although staple devices have been proposed, there has not yet been proposed a device for driving a staple partially into position and then providing a flush striking surface for driving it the rest of the way into the substrate. Additionally, insofar as applicant is aware, the method of holding the nail or staple by magnetic attraction in position into the guide tube through the use of a magnetic tip or fitting has not been proposed. Further, the expedient of adapting the length of the guide tube and the length of the impact rod by provision of separable parts has not been proposed to allow for driving nails or staples into locations of varying distances. Furthermore, the expedient of countersinking a fastening element into the substrate has not been shown nor has the expedient of driving a nail or staple only partially into the substrate for hanging objects or for easy removal at a later date.

SUMMARY OF THE INVENTION

According to this invention, fastening elements can be driven into inacessible places from short distances to relatively long distances due to the provision of guide tubes and impact rods of variable lengths. Additionally, according to this invention the fastening elements can be countersunk or they can be driven only partially into the substrate so as to allow objects to be hung therefrom such as pictures for easy removal at a later point. Additionally, there has not been provided to the art a device made up of separable pieces which can be carried in a case to a particular location and capable of being fabricated into a tool of variable length depending upon the accessibility of the location in which a fastening device is to be driven. Additionally, the invention contemplates the use of a penlight mountable upon the barrel of the guide tube so as to provide a source of light in a relatively inaccessible place.

DESCRIPTION OF THE PREFERRED EMBODIMENT

As previously mentioned, this invention is particularly useful in places where space is limited. Often in foundation work, when the forms are put into position it is necessary to drive nails and there is not a sufficient space available to swing a hammer. In other areas, particularly maintenance work, it is desired to drive nails or staples into position in places where pipes or other obstructions are in the way so that a hammer swing is difficult if not impossible or where the head room is so cramped that the physical effort required to swing the hammer is inconvenient. Additionally, in many places, particularly in maintenance work, the nail must be driven in a space where no light is available and where it is very difficult, if not almost impossible, to hold a flashlight or other lighting device and simultaneously drive a nail or staple into position. In many other cases, it is desired to drive a nail only partially into the substrate so that a picture or other decoration can be hung therefrom. In many other cases it is desirable to place a panel or other piece of lumber into position only temporarily so that it is desirable to nail only partially into position so that it can be easily removed later.

Figure 1:
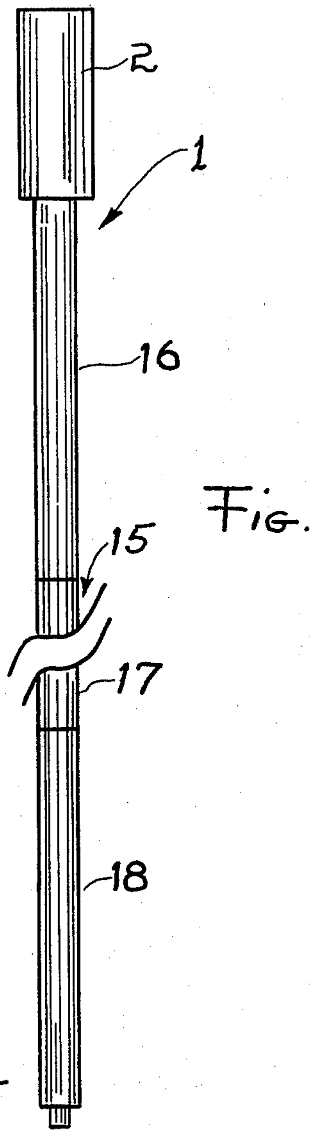
FIG. 1 is an elevational view of the apparatus.
Figure 2:
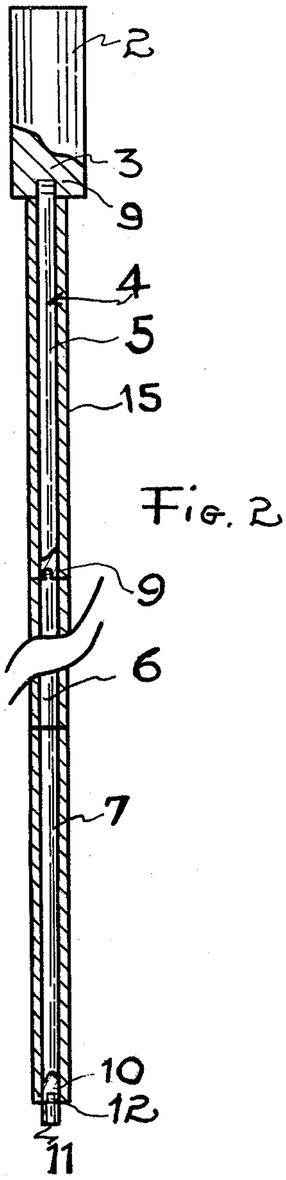
FIG. 2 is a sectional view of the apparatus.
Figure 3:
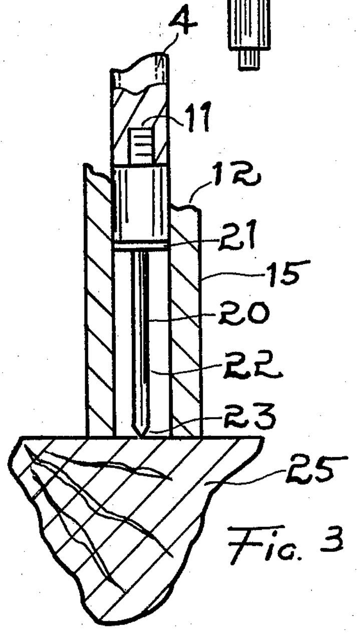
FIG. 3 is a view of the lower end of the apparatus with parts in section showing the nail in position to be driven into the wall or other surface.
Figure 4:
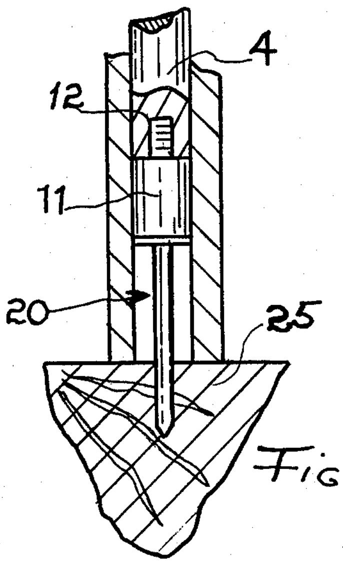
FIG. 4 is a sectional view of the end portion of the apparatus showing the nail in the process of being driven into the surface and FIG. 5 is the same view showing the nail completely driven into the wall or other surface.
Figure 5:
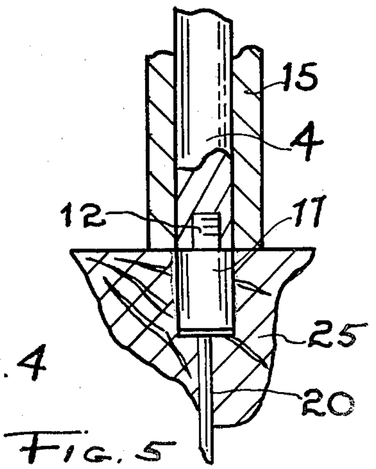

All of these purposes can be accomplished by the use of the axial impact tool 1 of this invention. The tool 1 comprises a heavy handle 2 containing a threaded recess 3 which is fitted upon an elongated impact rod 4. In the embodiment shown the impact rod 4 is made up of 3 elongated segments 5, 6 and 7 each containing a threaded stud 9 and a threaded recess 10. This allows the segment 7, for example, to fit into the threaded recess 10 of segment 6 by means of threaded stud 9. By the same token, the threaded stud 9 of segment 5 can fit into the threaded recess 10 of handle 2. Additionally, the magnetic tip 11 contains a threaded stud 12 which will fit into the threaded recess 10 of segment 7. The magnetic tip can have a flat planar striking surface 14 or can contain a receiving slot 13 for reception of a bight 27 of a staple 26. The impact rod 4 fits into a guide tube 15 which as shown is made up of separable mating threaded pieces 16, 17, 18 respectively. The length of the separable mating threaded pieces of guide tube 15 are essentially the same length in a preferred embodiment as the length of the elongated rod segments 5, 6 or 7. Thus, the tool can be lengthened or shortened, as desired, by the length of the elongated rod 7, and by the length of the separable mating threaded piece 18. Since only the tip of the rod is magnetic, it is not necessary as has been the practice of the prior art to use a non-magnetic guide tube. However, a non-magnetic guide tube can be used if desired or one segment of the guide tube can be non-magnetic only in the lower portion. In any event, in use as is shown FIG. 3, a nail 20 having a head 21 a shaft 22 and a point 23 is placed into position inside of the guide tube 15 so that the magnetic tip 11 of impact rod 4 is in driving position to drive the nail into the board or substrate 25. After the guide rod 4 has been retracted, it is forcibly extended by means of handle 2 so that the nail as shown in FIG. 4 is driven into the substrate 25. If, the magnetic tip 11 extends partially outside of the lower end of the guide tube 15 as is shown in FIG. 1, the impact rod 4 will drive the nail below the surface 25 of the substrate, thus countersinking same. This, of course, can be regulated by regulating the length of the impact rod assembly 4 and the magnetic tip 11. Thus, for example, if it is desired only to drive the nail 20 flush with the surface, the magnetic tip 11 should be arranged in such a way that it extends flush with the lower end of the guide tube 15.

Figure 14:
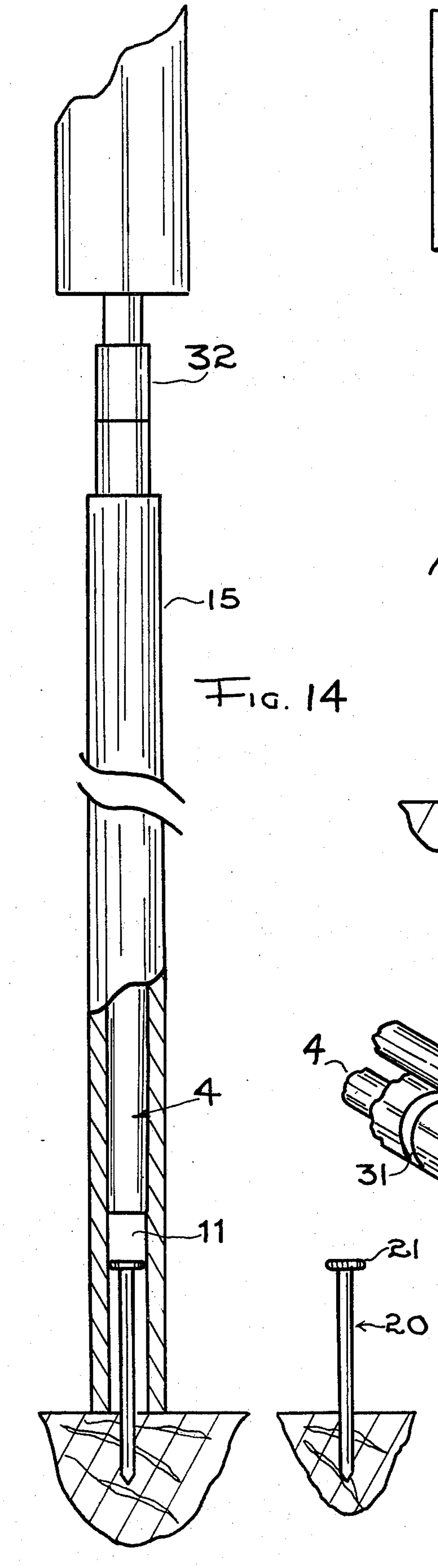
FIG. 14 illustrates the apparatus with portions in section showing a nail partially driven into a substrate, and illustrating the spacers used to prevent the nail from being driven completely into the substrate.
Figure 15:
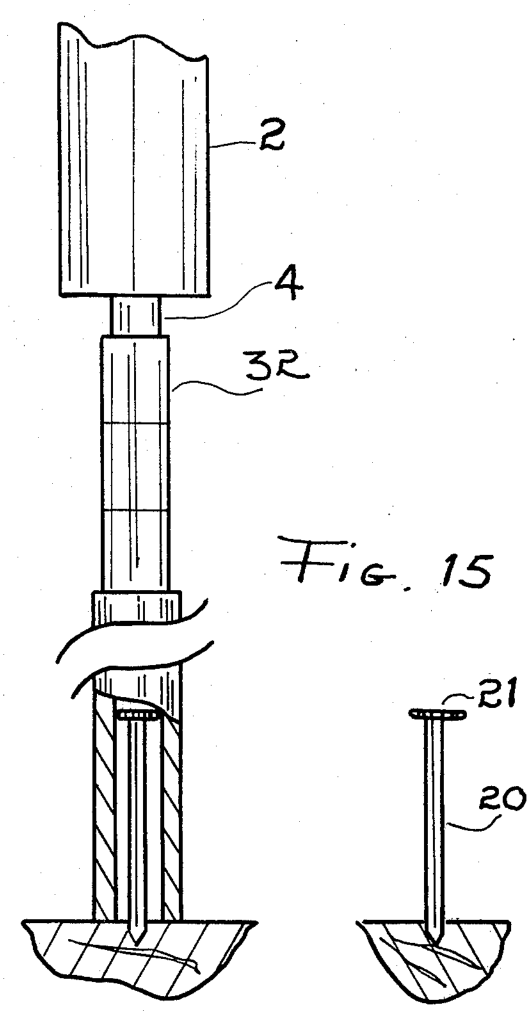
FIG. 15 illustrates the same tool, utilizing a larger number of spacers to leave more of the shaft of the nail exposed after being driven into the wood or other substrate.

If, on the other hand, it is desired to drive the nail only partially into the substrate, so as to provide a nail head and exposed shank for hanging a picture or piece of clothing, or for placing a structural building unit into position temporarily so that the fastening means can be easily removed later, a spacer unit 32 can be used as is shown in FIGS. 14 and 15. The spacer units fits between the handle 2 and the upper end of the guide tube 15 so that the impact rod 4 upon full extension does not completely reach the lower end of the guide tube. Thus as is shown in FIGS. 14 and 15 the nails are only partially driven into the substrate. The exposure of the shaft 22 and the head 21 depends upon the length of the spacers used or the number of spacers used if the spacers are all the same length. In better practice I have found that by using one or more spacers of a particular length, almost any variation can be achieved depending upon the desirability of the length of exposure of the nail and shaft outside of the substrate.

Figures 6, 7, 8, 9, 10, 11, 12, 13:
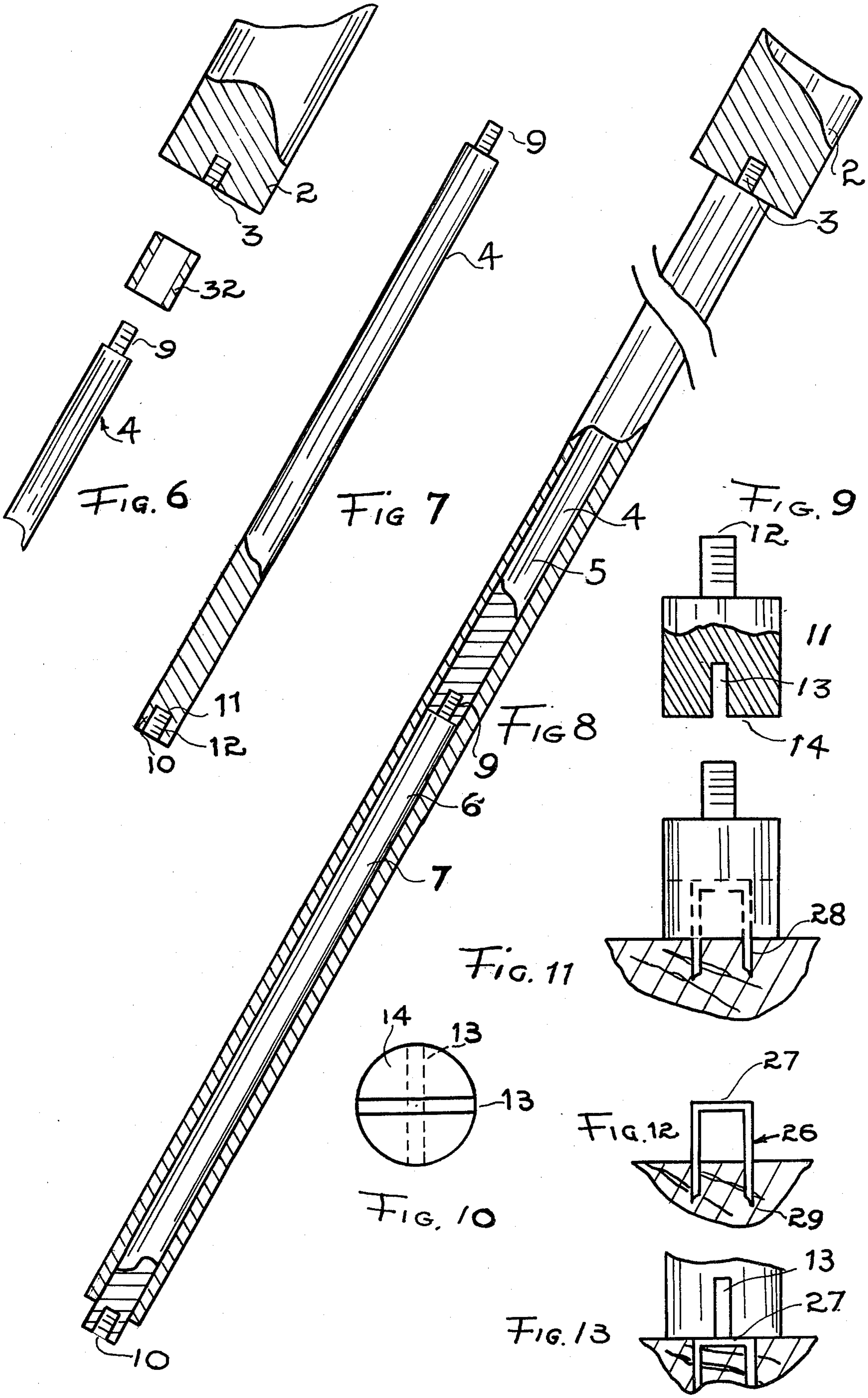
FIG. 6 is an exploded view showing the handle, a portion of the driving rod and the spacer unit.
FIG. 7 is a view partially in section showing the segment of the extension of the driving rod.
FIG. 8 is a sectional view showing the various extension options for both the rod and the guide tube.
FIG. 9 is a sectional view of the magnetic tip illustrating the threaded stud and the slot for accomodating a staple.
FIG. 10 is an end view of the magnetic tip illustrating the relationship of the slot and the driving surface.
FIG. 11 is a view of the magnetic tip only showing the staple being driven into a piece of wood.
FIG. 12 illustrates the staple partially driven into the wood after the magnetic tip has been retracted.
FIG. 13 shows the staple completely driven into the piece of wood.

As to the use of staples 26, particularly those as shown in FIGS. 11 through 13, having a straight bight 27 and with legs 28 and points 29, the staples 26 are fitted into a receiving slot 13 in the striking surface 14 of the magnetic tip 11. Thus the staple 26 is held into position firmly both by the walls of the slot 13 and by the magnetic attraction of the magnetized tip 11. So, as is shown, in FIG. 11 the staple being driven into the substrate 25 is partially exposed. If it is desired to drive the staple 26 flush with the substrate 25, the handle and impact rod are turned 90 degrees so that the slot 13 shown in phantom lines in FIG. 10 is transversely disposed to the slot 13 shown in full lines. Thus, there is provided an essentially solid striking surface 14 by which the staple can be driven the additional length into the substrate.

Figure 16:
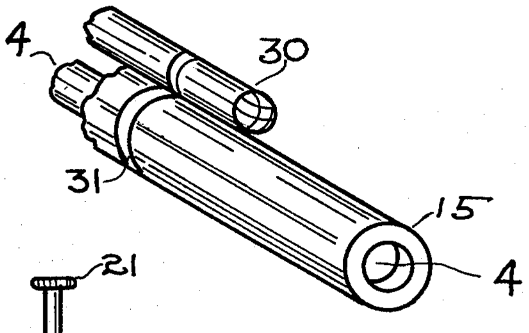
FIG. 16 illustrates a modification in which a bracket is added to the guide tube for provision of a pen light for work in dark spaces.

As is further shown in FIGS. 16, a bracket 31 is provided for mounting a pen light 30 on the barrel of the guide tube 15 so as to illuminate dark spots for driving a fastening device into position.

Many modifications will occur to those skilled in the arts from the detailed description hereinabove given and such description is meant to be exemplary in nature and non-limiting except so as to be commensurate in scope with the appended claims.

I claim:

1. A method of driving a fastening means in the form of a staple, into a substrate, which comprises the steps of:

A. placing an impact rod with a heavy handle and a magnetic tip having a receiving slot on its contact and striking surface into one end of a guide rod;

B. engaging the bight of said staple into said receiving slot in the magnetic tip of said impact rod;

C. retracting said impact rod and said staple magnetically connected thereto;

D. extending said impact rod to partially drive said staple into said substrate;

E. retracting said impact rod so as to disengage said receiving slot of said magnetic tip from the bight of said staple, F. turning said impact rod and said magnetic tip about 90° so that the receiving slot lies more or less transversely to the bight of said staple; and G. extending said rod fully in a driving stroke, to drive the exposed part of said staple fully into said substrate.

2. An axial impact tool comprising:

A. an elongated guide tube;

B. an elongated impact rod slidable within said guide tube;

C. a heavy handle fitted on one end of said rod and extending outside of said guide tube;

D. a magnetic fitting mounted at the other end of said impact rod and slidable into and out of the other end of said guide tube, said fitting having:

1. a diameter small enough to slide freely into and out of said tube,
2. a fastening means for mounting said fitting onto said impact rod, and
3. a contact and striking surface for holding a ferro-magnetic fastening member in driving position and for driving said ferro-magnetic fastening member into a substrate;

E. the improvement of an impact rod adjustable in length and comprised of two or more elongated pieces, in which:

1. one end of each piece contains a threaded recess,
2. the other end of each piece contains a threaded stud for fitting into the threaded recess of another piece,
3. so the impact rod can be shortened or lengthened by removal or addition of a separate elongated piece as required.

3. An axial impact tool, as defined in claim 2, in which the guide tube is made of separable mating threaded pieces so that the guide tube in use can be lengthened or shortened as required for accessibility.

* * * * *